US011837256B1

(12) United States Patent
Harvey et al.

(10) Patent No.: US 11,837,256 B1
(45) Date of Patent: Dec. 5, 2023

(54) HAMR READ-WRITE HEAD WITH COUPLER AND WAVEGUIDE

(71) Applicant: Seagate Technology LLC, Fremont, CA (US)

(72) Inventors: Christopher Neil Harvey, Londonderry (GB); Aidan Dominic Goggin, Donegal (IE); Chuan Zhong, Londonderry (GB)

(73) Assignee: Seagate Technology LLC, Fremont, CA (US)

( * ) Notice: Subject to any disclaimer, the term of this patent is extended or adjusted under 35 U.S.C. 154(b) by 0 days.

(21) Appl. No.: 17/851,367

(22) Filed: Jun. 28, 2022

Related U.S. Application Data

(60) Provisional application No. 63/215,955, filed on Jun. 28, 2021.

(51) Int. Cl.
  *G11B 5/00* (2006.01)
  *G11B 13/08* (2006.01)
  *G11B 5/012* (2006.01)
  *G02B 6/42* (2006.01)

(52) U.S. Cl.
  CPC ............ *G11B 13/08* (2013.01); *G02B 6/4206* (2013.01); *G11B 5/012* (2013.01); *G11B 2005/0021* (2013.01)

(58) Field of Classification Search
  CPC ........ G11B 11/10536; G11B 11/10504; G11B 2005/0021; G11B 5/4866; G11B 5/6088; G11B 5/314; G11B 5/127; G11B 220/2525; G11B 5/00
  USPC .......................................................... 360/59
  See application file for complete search history.

(56) References Cited

U.S. PATENT DOCUMENTS

| 9,099,139 B2* | 8/2015 | Gage .................... G11B 5/6088 |
| 9,251,830 B1 | 2/2016 | Duda et al. |
| 9,595,288 B1 | 3/2017 | Chu et al. |
| 9,746,623 B2 | 8/2017 | Peng et al. |
| 9,786,314 B1 | 10/2017 | Peng |
| 9,978,409 B2* | 5/2018 | Peng .................... G11B 5/4866 |
| 10,490,221 B1 | 11/2019 | Chen |
| 10,783,917 B1* | 9/2020 | Goggin ................. G11B 5/314 |
| 10,971,179 B1* | 4/2021 | Mehfuz ................ G11B 5/4866 |
| 2017/0162222 A1 | 6/2017 | Matousek et al. |

* cited by examiner

*Primary Examiner* — Nabil Z Hindi
(74) *Attorney, Agent, or Firm* — Kagan Binder, PLLC

(57) ABSTRACT

Described are heat assisted magnetic read-write heads that include a coupler, a waveguide, a transducer, and appurtenant structures, as well as related methods.

20 Claims, 5 Drawing Sheets

HAMR READ-WRITE HEAD WITH COUPLER AND WAVEGUIDE

PRIORITY CLAIM

This application claims the benefit of U.S. Provisional Patent Application Ser. No. 63/215,955, filed Jun. 28, 2021, entitled "METHODS TO SUPPRESS THE LASER POWER VARIATION FOR HAMR R/W HEAD," wherein said application is incorporated herein by reference in its entirety for all purposes.

FIELD

The invention relates to heat assisted magnetic read-write heads that include a coupler, a waveguide, a transducer, and appurtenant structures, and related methods.

BACKGROUND

Laser power stability is an important performance feature for a heat-assisted magnetic recording (HAMR) read-write head used for digitally recording information on a magnetic medium. High levels of laser power variation can lead to reduced performance of a HAMR read-write head, with possible data loss.

SUMMARY

The following describes designs of light guidance systems of HAMR read-write heads that include a light source (referred to as a "laser"), a coupler optically connected to the light source, a waveguide optically connected to the coupler, and a transducer that receives light energy from the waveguide. Light guidance systems of the present description are designed to reduce the variability of the power of light energy that is received by the transducer.

The amount (power) of light energy that passes through a light guidance system of a HAMR read-write head can be reduced or may experience variability due to features of the laser and the light emitted by the laser, due to features of a coupler, and features of a waveguide. Different physical features of the coupler and waveguide components of the light guidance system, such as indices of refraction and dimensions, can affect how light energy passes through the system, and, therefore, performance of the system with respect to power variability and the overall amount (efficiency) of light from the light source that reaches the transducer. Also affecting performance is the manner in which the different components fit and interact optically.

As one example of how a design of the coupler and waveguide components affects performance, an amount of reflection of light at an interface of a coupler or waveguide reduces performance. Light that is reflected at an interface between a laser and a coupler, and at an interface between a coupler and a waveguide, will reduce the amount of light that is transmitted through the system from the laser to the transducer. The amount light that reflects at an interface is affected by factors such as refractive indices of the components (and differences in their refractive indices), alignment between the laser and the coupler, and dimensions of the coupler and waveguide relative to the frequency or mode of the laser. Examples of light guidance systems of a HAMR read-write head of the present description may be designed to reduce reflection at interfaces of the system.

A different example of reduced performance of a light guidance system is referred to as "mode hopping." The output of a semiconductor laser can vary based on the temperature of the laser, and that temperature can vary during use. In some temperature ranges the output (power output) of the laser varies gradually or linearly. But in other temperature ranges the output (power) level may change in erratic shifts or "jumps." These occur when the laser switches from one longitudinal mode to another, which is referred to as "mode hopping." Under some circumstances, these mode hops occur in an erratic manner, with the laser switching back and forth rapidly between wavelengths. During mode hopping, the laser's power output fluctuates. Examples of light guidance systems of a HAMR read-write head of the present description may be designed to reduce the effects of mode hopping.

As a preference, a HAMR read-write head may be designed to include, to the extent possible, a laser that has a longer length rather than a shorter length. To allow for added length of a laser, a different component must typically be reduced in size. As described herein, a coupler component of a light guidance system may be reduced in size to accommodate a longer laser. The size (length) of the coupler may be reduced by including as part of the coupler a diffractive cavity that is in optical communication with the coupler. Example diffractive cavities, in the form of a disk, can act as a focusing structure that produces a lensing effect. This focusing and lensing effect accelerates the coupling which allows the coupler to be reduced in length or shortened. The shorter coupler then allows space for a larger size (longer) laser.

As described herein, the Applicant has identified HAMR read-write head designs that include a laser, a coupler, a diffractive cavity as part of the coupler, and a waveguide, that can operate with useful or advantageous levels of power variability and efficiency.

In one aspect, the invention relates to an apparatus that includes: an optical coupler that receives light from a light source at a coupler input facet, the coupler having a length extending from the input facet in a direction of light propagation through the coupler; a waveguide coupled to the optical coupler at a coupler-waveguide interface; a diffractive cavity coupled to the optical coupler between the input facet and the coupler-waveguide interface; and a near-field transducer coupled to the waveguide, that provides electromagnetic heating for a heat assisted magnetic recording write head.

In another aspect, the invention relates to a method of recording data using a heat assisted magnetic recording head. The magnetic recording head includes: a light source; an optical coupler that receives light from the light source at a coupler input facet, the optical coupler having a length extending from the input facet in a direction of light propagation through the coupler; a waveguide coupled to the optical coupler at a coupler-waveguide interface; a diffractive cavity coupled to the optical coupler between the input facet and the coupler-waveguide interface; and a near-field transducer coupled to the waveguide, that provides electromagnetic heating for a heat assisted magnetic recording write head. The method includes: activating the light source to direct light into the coupler input facet, and allowing the light to propagate through the coupler and into the waveguide, to be received by the near-field transducer.

In yet another aspect, the invention relates to a method of preparing a light guidance system that includes an apparatus as described. The apparatus includes: a laser light source; an optical coupler that receives light excited by a light source at a coupler input facet, the coupler having a length extending from the input facet in a direction of light propagation through the coupler; a waveguide coupled to the optical coupler at a coupler-waveguide interface; a diffractive cavity coupled to the optical coupler between the input facet and the coupler-waveguide interface; and a near-field transducer coupled to the waveguide, that provides electromagnetic heating for a heat assisted magnetic recording write head. The light guidance system experiences mode hopping that varies based on a length of the laser. The method includes forming the laser to have a length that corresponds to a region of a minimum on a curve of mode hop effect versus laser length.

BRIEF DESCRIPTION OF THE DRAWINGS

FIG. 3A show top views of a previous coupler (top) and a coupler as described (bottom) that includes a disk-shaped diffractive cavity; FIG. 3B is a side view of a coupler as described that includes a disk-shaped diffractive cavity; FIG. 3C is a top-perspective view of a coupler as described that includes a disk-shaped diffractive cavity.

The drawings are exemplary, non-limiting, schematic, and are not to scale.

DETAILED DESCRIPTION

The present disclosure relates to heat-assisted magnetic recording (HAMR) devices and their related methods, which are also referred to as energy-assisted magnetic recording (EAMR), thermally-assisted recording (TAR), thermally-assisted magnetic recording (TAMR), etc. In a HAMR read-write head, a near-field transducer concentrates light energy into a tiny optical spot in a recording layer of a recording media, which raises the media temperature locally. The hotspot reduces the writing magnetic field required for high-density recording, and the size (area) of the hot spot determines the data bit dimension.

The HAMR read-write head is incorporated into a "slider" that includes the read-write head that includes the near-field transducer, a light source (e.g., laser), a light guidance system that directs the light energy to the near-field transducer, a write pole, an air-bearing surface that controls a spacing between the slider and the recording media during use, among other structures that are useful for the read-write head.

The light guidance system includes a coupler, a waveguide, and cladding at surfaces of the waveguide or coupler to surround the waveguide or coupler. The waveguide is made of material that has a high index of refraction, the cladding is made of material that has lower index of refraction, and the coupler is made of material that has an index of refraction that is between the cladding and the waveguide. An example of a material useful for a waveguide is a niobium oxide (generally referred to as NbOx), but other materials are also useful, including a tantalum oxide (generally referred to as TaOx), a titanium oxide (generally referred to as TiOx), SiN, SiON. The material of the refractive cavity can be made of the same material as the waveguide. Examples of materials useful for a coupler include SiON and AlOx, but other materials are also useful. An example of a material useful for cladding is $SiO_2$, but other materials are also useful.

The laser ("light source") is bonded to the slider on a mounting surface (e.g., a top surface) of the slider. Light that is emitted from the laser enters the light guidance system through the coupler or the waveguide, passes from the coupler (sometimes referred to as an "input coupler" or a "waveguide coupler") into the waveguide, then propagates in a direction away from the laser, through the waveguide, to contact the near-field transducer located at the air-bearing surface (ABS) of the slider.

Figure 1A:
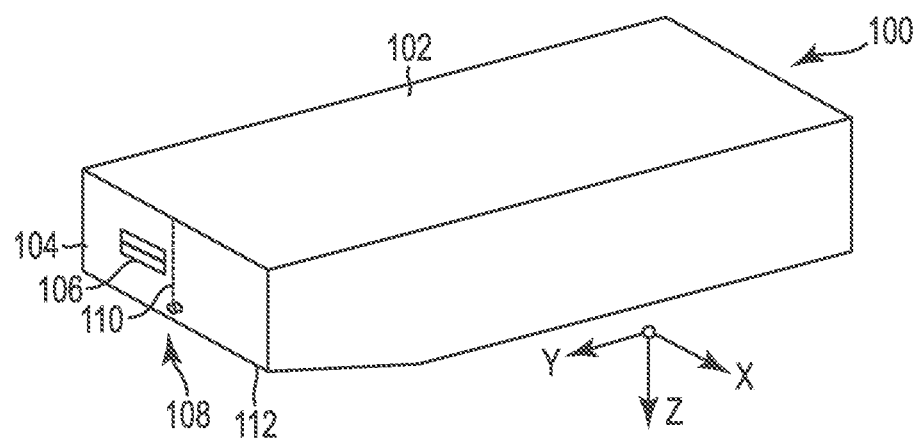
FIGS. 1A and 1B show example structures of a heat-assisted magnetic recording device.

Read-write head 100 is shown at FIG. 1A. Head 100 may be used in a HAMR hard disk drive. Head 100 has a slider body 102 with integrated read-write transducers 108 at trailing edge 104. During use, transducers 108 are held near to but without contacting a surface of a moving magnetic recording medium (not shown), e.g., a magnetic disk. The illustrated head 100 is configured as a HAMR read-write head with light source 106 (e.g., laser diode unit) and waveguide 110 (illustrated in FIG. 1A schematically as a centerline of a waveguide), both of which are integrated into slider body 102. Waveguide 110 delivers electromagnetic energy that is emitted by light source 106, to a near-field transducer (NFT) that is part of the read-write transducers 108. The near-field transducer achieves surface plasmon resonance and directs energy from media-facing surface 112 toward an adjacent magnetic recording medium, to create a small hot spot at a surface of the adjacent recording medium.

Figure 1B:
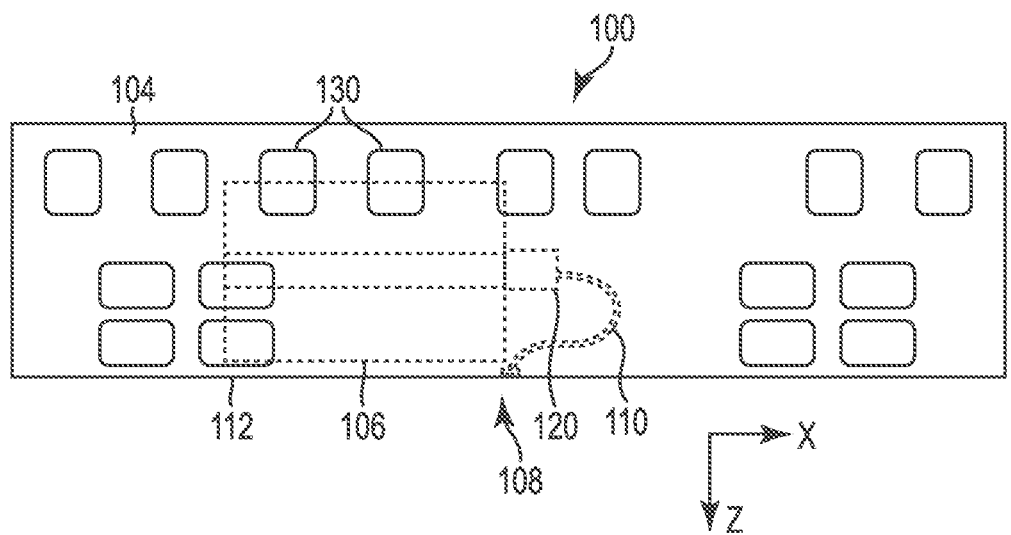

Referring to FIG. 1B, a view of trailing edge 104 of slider body 102 shows additional details. Trailing edge surface 104 is parallel to a substrate upon which components of head 100 are built using layer deposition and transfer printing techniques. Components that are integrated into head 100 include waveguide 110, light source 106, read-write transducers 108, and optical coupler 120. Light source 106 is incompatible with growth on the substrate and other material layers, and is integrated by transfer printing or an equivalent thereof. After material layers are deposited to form the components, conductive pads 130 are formed on trailing edge surface 104. Pads 130 are bonded to electrical lines (e.g., flex circuits) that carry signals between head 100 and controller circuitry of a magnetic recording drive.

In this example, light source 106 is oriented with an elongated dimension in the cross-track direction (x-direction in these figures). Generally, light source 106 will include an active laser region (also referred to as a quantum well, gain region, etc.) that is formed of one or more non-self-supporting layers of crystalline material. By orienting light source 106 in the cross-track direction, a desired optical output and wavelength can be obtained while minimizing the height of the head 100 (measured normal to the media-facing surface 112, in the "z-direction"). A reduced height of head 100 reduces the clearance needed above the slider and allows for closer vertical stacking magnetic recording disks.

FIG. 1B shows optical coupler 120, which provides an optical connection and optical communication between light source 106 and waveguide 110, i.e., which "couples" the light emitted from light source 106 with waveguide 110.

Example read-write heads of the present description are assembled to have components that include a light source, a coupler, a diffractive cavity as part of the coupler, and a waveguide as components of a light guidance system. A cladding layer is located at outer surfaces of the waveguide and the coupler. These components are part of an assembled HAMR read-write head, and cooperate with other components of the head (a write pole, an air-bearing surface, electrical communications) to perform reading and writing functionalities as part of a HAMR disk drive.

The design of the components of a light guidance system (e.g., shapes and dimensions of the components) of the present description and how the components are assembled together (e.g., sizes and locations of interfaces) can produce a read-write head that operates with a useful or an advantageous level of variability of power supplied to a near-field transducer. The head may also exhibit reduced negative performance effects caused by mode-hopping of a laser light source, and may perform at a useful or advantageous level of efficiency and power variability when transmitting light from a light source through the coupler and waveguide to the near field transducer.

Novel light guidance systems of the present description can be designed to reduce laser power variability, i.e., the power of laser energy that is received by a near-field transducer that is in communication with the light guidance system. A light guidance system of this description includes a coupler that has a diffractive cavity as part of the coupler. The diffractive cavity is located on a top surface of a straight portion of a coupler, between an input facet of the coupler and a waveguide that is in optical communication with the coupler, near an input end of the coupler. The waveguide is at a location that is spaced from or "recessed," relative to the coupler input facet. Advantageously, the design of the coupler, which includes the diffractive cavity, allows for the use of a coupler that has a reduced overall length, which in turn allows for the system to include a light source (e.g., laser), that has an increased length. A longer length of a laser can be an advantage, because a longer laser can operate at a relatively lower temperature compared to a laser that is shorter but otherwise comparable, and as a result is more reliable. According to example systems, a longer laser may also be useful to reduce susceptibility of the laser to mode hopping when exposed to external optical feedback. This allows the drive to reduce the amount of performance margining needed to protect against the laser mode hopping.

Generally, a light guidance system includes an "input end," which is an end of the system that engages or is closest to the light source. Light from the light source enters the light guidance system at the input end and travels through the coupler and through the waveguide in a direction of propagation away from the light source, in a direction toward a near-field transducer, and is delivered at an output end of the waveguide that is in optical communication with the near-field transducer. The coupler includes a coupler input facet that is in optical communication with the light that is emitted by the light source and receives light energy directly from the light source through the coupler input facet.

Figure 2A:
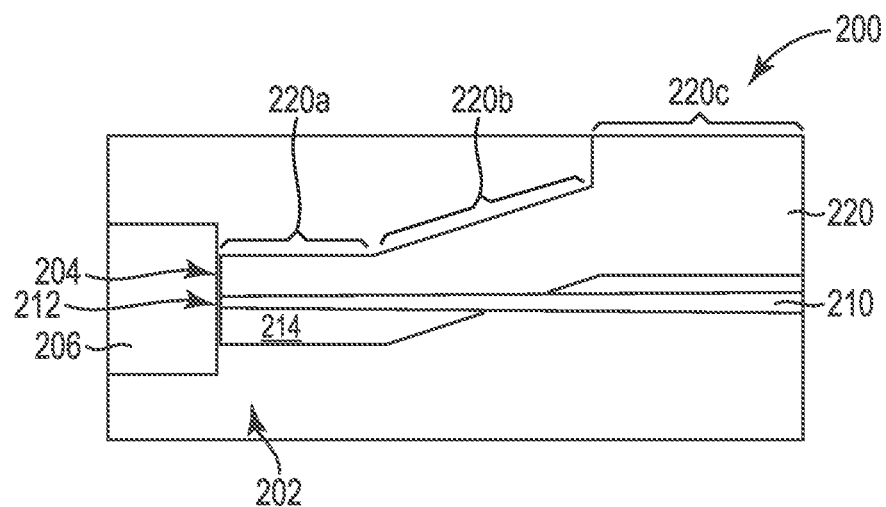
FIGS. 2A and 2B show example structures of a light guidance system of a heat-assisted magnetic recording device.
Figure 2B:
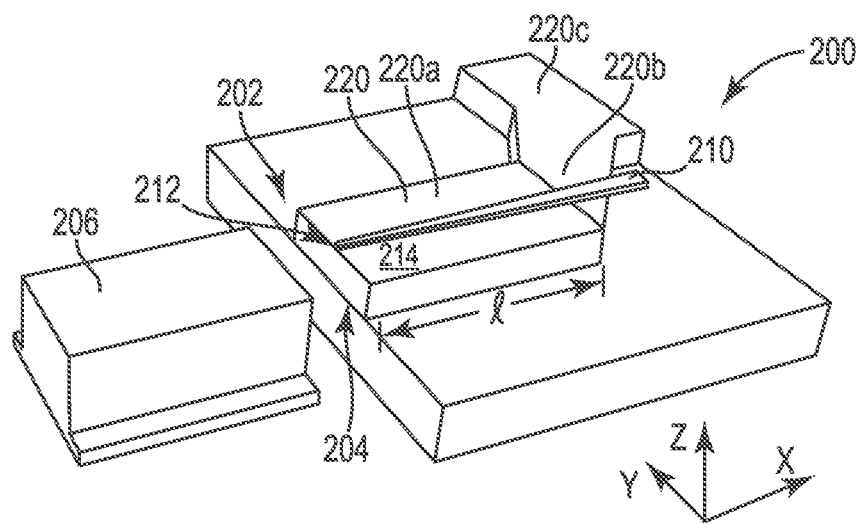
Figure 2B:
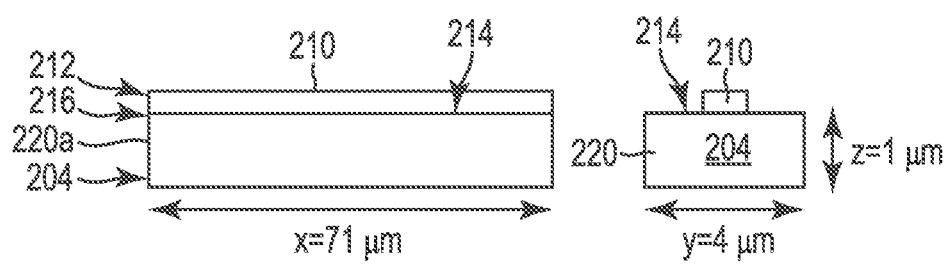

According to a previous waveguide design, an input end of a waveguide and an input end of a coupler both have an input facet that directly faces and is optically connected to (is "in optical communication with") the light source, to receive light directly from the light source through the waveguide input facet. As shown at FIGS. 2A and 2B, light guidance system 200 includes light source 206, coupler 220, and waveguide 210. Coupler 220 includes straight portion 220a at the input end of system 200, which includes input facet 204 having an area that faces light source 206 to directly receive light from light source 206. Coupler 220 additionally includes angled portion 220b that connects at one end to straight portion 220a, and that connects at a second end to end portion 220c. End portion 220 functions as an "escape slab," which is designed to allow any light that passes into the escape slab to be scattered as incoherent light away from the waveguide.

At input end 202 of system 200 of FIGS. 2A and 2B, coupler 220 and waveguide 210 are each in optical communication with light source 206 At input end 202, coupler 220 includes input facet 204, which has an area that faces light source 206. Also at input end 202, waveguide 210 includes input facet 212 having an area that faces light source 206 to directly receive light from light source 206. In this system, a portion of light that is emitted from light source 206 enters coupler 220 through coupler input facet 204, and a portion of the light also enters waveguide 210 through waveguide input facet 212.

Light passes into waveguide 210 through waveguide input facet 212, and light also passes into waveguide 210 from coupler 220. Waveguide 210 is optically connected to coupler 220 at coupler-waveguide interface 216, which is an area of contact between a bottom (in the z-direction as illustrated) surface of waveguide 210 and an upper surface 214 of coupler 220, along a length (x-direction) and a width (y-direction) of waveguide 210 starting at waveguide input facet 212 and extending along coupler-waveguide interface 216 at straight portion 220a, and along part of angled portion 220b. Light that enters coupler 220 through coupler input facet 204 travels within coupler 220, and a portion of the light passes from coupler 220 into light guide 210 by passing through coupler-waveguide interface 216.

The light that enters waveguide 210, either by passing through coupler-waveguide interface 216 or by entering waveguide 210 through waveguide input facet 212, travels in a light propagation direction away from light source 206, along a length of waveguide 210, and eventually is received by a near field transducer (not shown). Waveguide 210 is tapered, with a width that gradually increases along the length direction in a direction away from a waveguide input end (the end closest to a light source). The waveguide width gradually increases along the length of the waveguide extending away from the input end, while the height remains constant along the length. According to example tapered waveguides, a height (dimension in a z-direction) of the waveguide may be in a range from 80 to 160 nanometers, e.g., from 100 to 140 nanometers, and remains constant along the length. Also according to example tapered waveguides, widths along the length may be in a range from about 100 nanometers up to 2000 nanometers. For example, a width at a waveguide input end may be in a range from 50 to 200 nanometers, and the width can increase to a maximum width in a range from 1000 to 1500 nanometers, e.g., from 1100 to 1300 nanometers. These dimensions are listed as examples, and dimensions outside of these ranges can also be useful.

The insert at the bottom of FIG. 2B shows an example of a length (1) of a straight portion 220a of coupler 220 (71 microns) and a width (4 microns) and height (1 micron) of straight portion 220a of coupler 220 at coupler input facet 204. The insert also shows that waveguide 210 extends the entire length of straight portion 220a of coupler 220, with waveguide input facet 212 being aligned vertically (in the z-direction) with coupler input facet 204.

In contrast to the previous design shown at FIGS. 2A and 2B, a light guidance system of the present description includes a coupler that has a diffractive cavity as part of the coupler, located between an input facet of the coupler and a waveguide that is also in communication with the coupler.

A coupler of this description includes a diffractive cavity, which is an optical device near an input end of the coupler, between an input facet of the coupler and a location of a waveguide that also communicates with the coupler. The diffractive cavity has a size, has optical properties (e.g., refractive index), and is placed in optical communication with the coupler at a location that allows light that enters the coupler through the coupler input facet to be transmitted efficiently from the input facet to the waveguide, with the coupler having a reduced overall length compared to a length of an otherwise comparable coupler that does not include the diffractive cavity.

With the diffractive cavity included as part of the coupler, adjacent to the input end, the waveguide must be placed at a position that is a distance away from light source 206 along the length of coupler straight portion 220a. The waveguide does not include a waveguide input facet that directly receives light from the light source. Instead, the waveguide input end (the end of the waveguide that is closest to the light source) is spaced from the waveguide input facet, and is also spaced from the diffractive cavity. The waveguide connects optically with the coupler but does not extend to the light source and does not include a waveguide input facet that faces and optically communicates directly with the light source. The waveguide does not receive light energy directly from the light source through a waveguide input facet, but the waveguide is in optical communication with the coupler at a coupler-waveguide interface, which is separated from the coupler input facet with the diffractive cavity located between the coupler-waveguide interface and the coupler input facet. The waveguide receives light energy from the light source by the light traveling from the light source into the coupler, optionally along a light path that includes a portion that is within the diffractive cavity, through a coupler input facet, then by the light passing from the coupler into the waveguide through the coupler-waveguide interface.

Figure 3A:
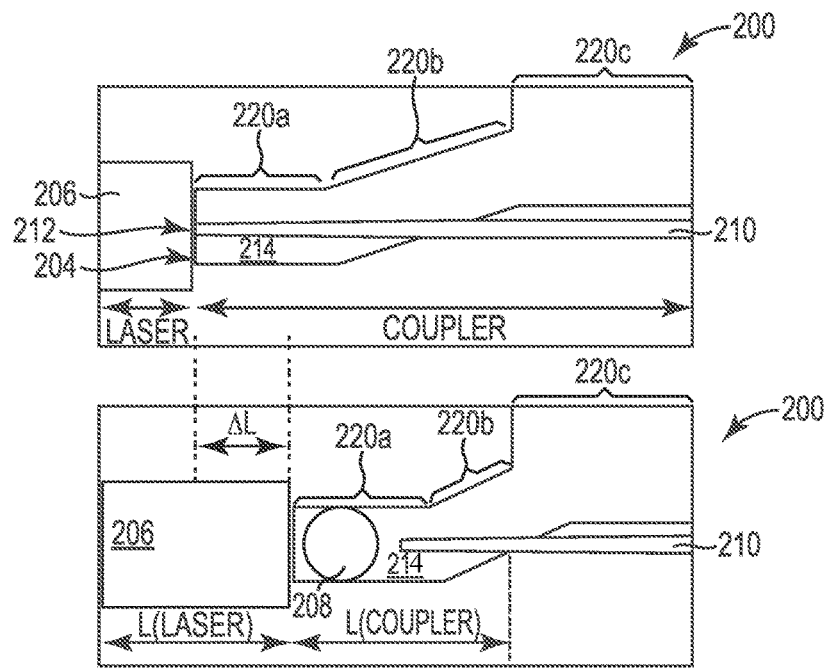
FIGS. 3A, 3B, and 3C show example structures of light guidance systems.

An example of such a waveguide and light guidance system is shown at FIGS. 3A (bottom), 3B, and 3C, which use numerical designations that are the same as those used for the description of system 200 of FIGS. 2A and 2B. Also shown at FIG. 3A (top portion) is the previous design of a light guidance system 200 as also shown at FIG. 2A, for a purpose of comparing the FIG. 2A design to the inventive design.

Figure 3B:
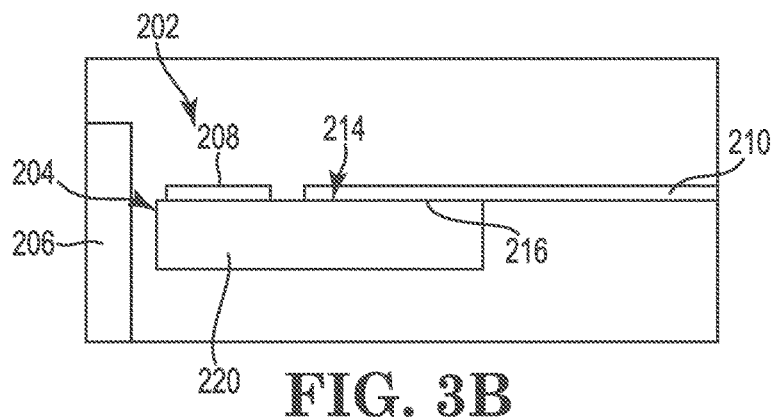
Figure 3C:
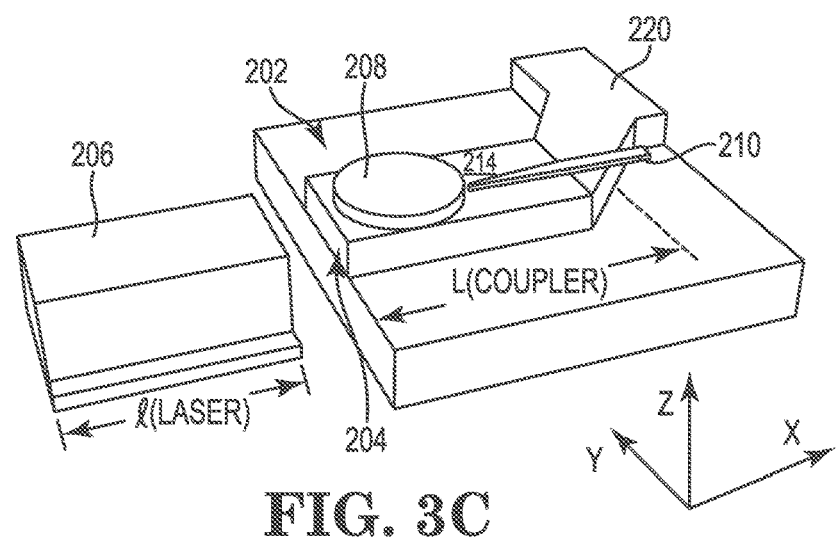

As shown at FIGS. 3A, 3B, and 3C, the inventive light guidance system includes a diffractive cavity 208 connected optically on a top surface 214 of straight portion 220a of coupler 220, as well as waveguide 210, which may be tapered. During use, light that enters coupler 220 through input facet 204 can pass through an interface between upper surface 214 of coupler 220 and a lower surface of diffractive cavity 208, then pass through diffractive cavity 208, then re-enter coupler 220, and then enter waveguide 210 at coupler-waveguide interface 216. An efficient lensing or focusing effect occurs in the y direction due to diffractive cavity 208. The y-dimension of waveguide 210 is larger than the z-dimension (see FIG. 2B). A focusing effect in the y direction can be particularly useful because the y-direction is the largest dimension at the input end of the coupler.

As shown at FIGS. 3A (bottom), 3B, and 3C, coupler 220 includes a straight portion 220a at the input end of system 200, which includes input facet 204 having an area that directly receive light from light source 206. Coupler 220 additionally includes angled portion 220b that connects at one end to straight portion 220a and that connects at the other end to end portion 220c.

At input end 202 of system 200, coupler 220 is in optical communication with light source 206. Coupler input facet 204 has an area that faces light source 206 such that light emitted from light source 206 enters coupler 220 through coupler input facet 204. Waveguide 210 is optically connected to coupler 220 at coupler-waveguide interface 216 along a length (x-direction) and a width (y-direction) of waveguide 210 that extends along a partial length of straight portion 220a and along part of angled portion 22b. Light that enters coupler 220 through coupler input facet 204 travels within coupler 220, including optionally along a path within diffractive cavity 208, and can pass from coupler 220 into light guide 210 by passing through coupler-waveguide interface 216.

For comparison, the upper diagram of FIG. 3A shows a previous design of a light guidance system 200, as is also shown at FIG. 2A. The lower diagram of FIG. 3A shows inventive system 200, with diffractive cavity 208 located between input facet 204 of coupler 220 and waveguide 210. As is illustrated, the total length of coupler 220 of system 200 of the lower diagram, which includes diffractive cavity 208, is shorter than the total length of coupler 220 of the upper diagram, which has a previous design that does not include a diffractive cavity as part of the light guidance system. In particular, a length reduction (ΔL) of coupler 220 allows for an increased length of light source 206 in the same amount, while a total length for the combined laser and coupler components is not changed.

Figure 4:
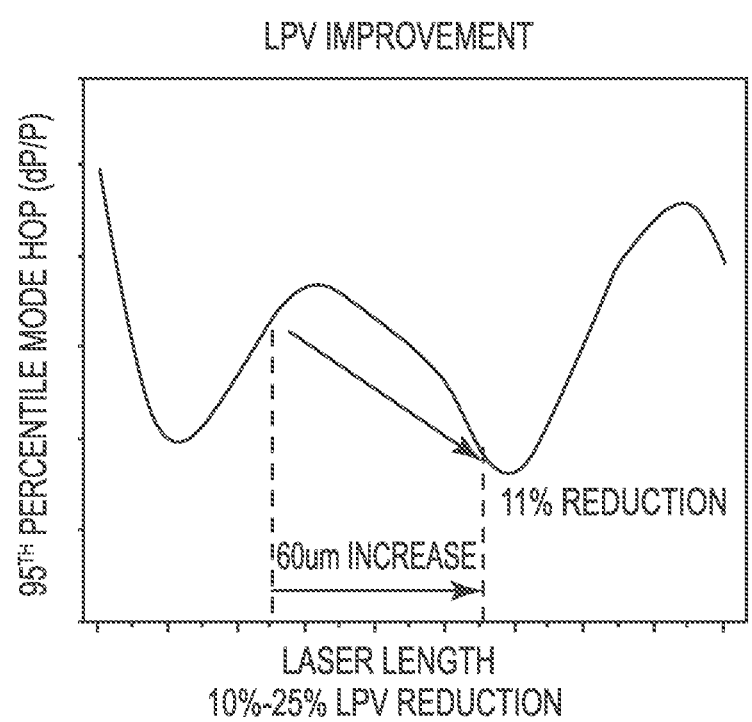
FIG. 4 is a graph of a mode-hopping effect versus laser length of a light guidance system.

The magnitude of the length reduction (ΔL) can be a distance that produces a useful or a maximum reduction in mode-hopping effect. As shown at FIG. 4, an effect of mode hopping varies along a non-linear curve as laser length changes. A useful or preferred increase in a laser length (ΔL) of a light guidance system can be an amount of the length of the laser that places the laser length at a region of a minimum of a curve of mode-hopping effect versus laser length, e.g., as shown at FIG. 4.

Considered differently, the use of a diffractive cavity as described as part of a coupler allows a light guidance system to be designed with a range of different laser lengths, and allows a laser length to be selected to have a reduced mode hopping effect. Based on laser performance, considered as a comparison of mode hopping effect versus laser length (e.g., as shown at FIG. 4), the coupler with the diffractive cavity can be designed to have a length that allows the light guidance system to include a laser of a preferred length. By adjusting (e.g., reducing) the length of the coupler, using a diffractive cavity, the length of the laser may be selected to produce a desirably low mode hopping effect, e.g., the length of the laser may be selected to correspond to a low level of mode hopping effect, at a low portion or a minimum of a curve as shown at FIG. 4.

Other features of a system 200 as described, which includes a diffractive cavity 208, can be selected to provide useful or advantageous functionality of the system, e.g., to reduce mode hopping or the effects of mode hopping, to increase overall coupling efficiency, or to reduce power variability. Features that can be adjusted to affect one or more of these performance features include: dimensions of the coupler (e.g., width, thickness, length), an angle between a straight portion 220a and an angled portion 220b, a size (e.g., radius) of the diffractive cavity, a distance between the diffractive cavity and the waveguide, and the spacing of light source 206 and coupler input facet 204.

An example coupler may have a width in a range from 1 to 5 microns, e.g., from 2 to 4 microns.

An example coupler may have a thickness in a range from 0.7 to 1.2 microns, e.g., from 0.8 to 1.1 microns.

A coupler may have any useful length, and length may be measured in various bases. A useful measure of length is the distance from a coupler input facet to a location at which the waveguide crosses the angled portion of the coupler. This is a distance from the coupler input facet to a location of a distal end of a coupler-waveguide interface, meaning the end of the coupler-waveguide interface that is farther from the light source. See "L(COUPLER)" at FIG. 3C. Examples of this length of a waveguide may be in a range from 7 to 40 microns, e.g., from 8 to 35 microns or from 9 to 30 microns.

An example coupler may have a diffractive cavity that is circular, i.e., a disk, with a radius in a range from 0.5 to 3 microns, e.g., from 1.0 to 2.8 microns or from 1.5 to 2.5 microns.

An example coupler may have a diffractive cavity that has a thickness (or "height" in the z-direction, not including a height of a coupler beneath the cavity) that is approximately equal to a thickness of the waveguide. See FIG. 3B showing a side-view of diffractive cavity 208 and waveguide 210, of approximately equal thickness (in the z-direction). The thickness of the waveguide and the thickness of the diffractive cavity may each, independently, be in a range from 70 to 170 nanometers, e.g., in a range from 80 to 160 nanometers or from 100 to 140 nanometers.

An example coupler may place the diffractive cavity a distance (in the x direction as illustrated) from the waveguide that is less than 10 microns, e.g., in a range from 2 to 8 microns or in a range from 4 to 6 microns.

An example coupler may have a small spacing (in the x direction as illustrated) between the coupler input facet and the light source, e.g., the coupler input facet may be spaced from the light source by distance of at least 0.2 microns, e.g., a distance in a range from 0.5 to 3 microns or from 1.0 to 2.0 microns.

An example diffractive cavity can be made of a material that is the same material, having the same index of refraction, as the material of the waveguide.

A laser of a light guidance system as described can have any useful length. According to methods of selecting a laser to have in a relatively longer length, with a reduced length of a coupler, an example of a useful or preferred laser may have a length of at least 100 microns, e.g., a length in a range from 100 microns to 350 microns.

A light guidance system such as that shown at FIGS. 3A (bottom), 3B, and 3C, that includes a diffractive cavity, particularly with a shortened overall length of the coupler and a longer length of a light source, can exhibit useful or improved performance compared to comparable light guidance systems that include a comparable coupler and a waveguide that does not include these features, as with the version of the light guidance system shown at FIGS. 2A and 2B.

As an example, a longer length of a laser may be used to achieve a reduction in mode hop by the longer laser corresponding to a low-point of a relationship between mode hop and laser length of a system. As shown at FIG. 4, for a system as described, a graph of an effect of mode hop (in terms of a change of laser power per total laser power (dP/P)) can vary based on laser length. The use of a coupler as described, with a diffractive cavity, can allow for a reduced length of the coupler, which can allow an increased length of a laser, with the longer laser length being selected to correspond to a region of a low point or minimum on a curve of a mode hop effect (e.g., dP/P) relative to laser length. The region of the low point or minimum may be a region of length that is within 10 or 20 percent of the minimum length value along the curve, or that is within (above or below, (+/−)) 20, 15, or 10 microns of the minimum value along the curve.

As shown at FIG. 4, for a system having the illustrated example of a relationship between laser length and mode hop (, e.g., in terms of a change in laser power per total laser power (dP/P)), increasing the laser length by 60 microns can reduce the mode hop effect by 11 percent. The reduction in the effect of mode hop due to the change of laser length will depend on the initial length of the laser, the amount of the length reduction, and the shape of the curve of the relationship of the mode hop effect at different laser lengths.

Figure 5A:
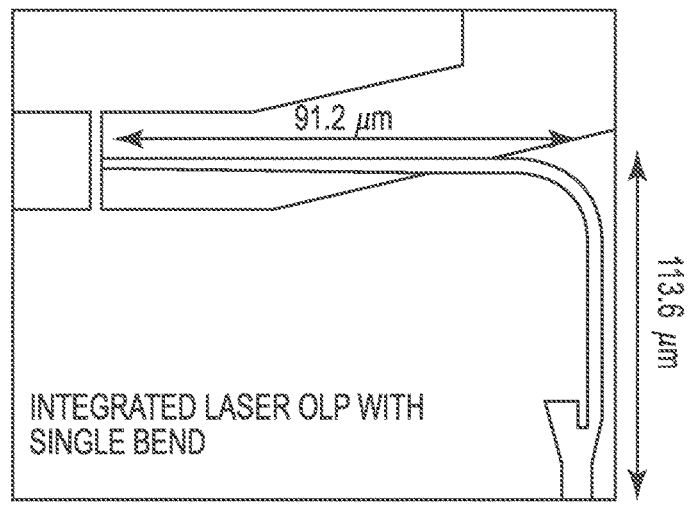
FIG. 5A is a top-view of an integrated laser optical light path (OPL) with a single bend.
Figure 5B:
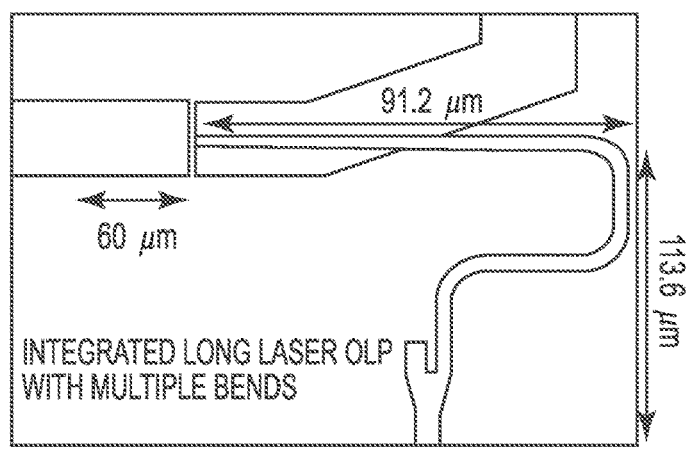
FIG. 5B is a top-view of an integrated longer-length laser optical light path (OPL) with multiple bends.
Figure 5C:
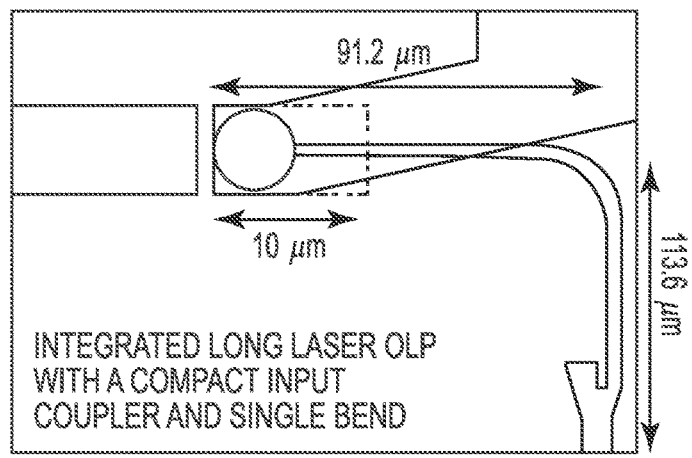
FIG. 5C is a top-view of an integrated longer-length laser optical light path (OPL) with a single bend.

As shown at FIGS. 5A, 5B, and 5C, a longer laser that can be used with coupler as described (having a diffractive cavity) can also allow for a desired or advantageous shape and length of an optical light path through a waveguide, with a system that includes a longer-length laser. As shown at FIG. 5A, a past design of a laser and a light guide includes a relatively shorter laser, and a light path that extends with a single bend and a total length of 204.8 microns. As shown at FIG. 5B, when a longer laser is incorporated into this design, the length of the waveguide must be increased and multiple bends must be added to the light guide to achieve the same length of a light path through the waveguide. But as shown at FIG. 5C, the novel design described herein, of a coupler that includes a diffractive cavity, can increase the optical light path without requiring a longer length of the coupler and waveguide; the coupler and waveguide of FIG. 5C, with the coupler including a diffractive cavity, produces an optical light path that is of a length of the system of FIG. 5A having a shorter laser, but with a longer laser and with a shorter coupler and waveguide.

In addition to features of light guidance systems as described, a light guidance system of this description can also include other added features that can allow for improved performance. These include features described in U.S. Provisional Patent Application No. 63/215,955, filed Jun. 28, 2021, entitled "METHODS TO SUPPRESS THE LASER POWER VARIATION FOR HAMR R/W HEAD," such as a "recessed" waveguide, a coupler having a trapezoidal cross section, and size and dimension features of waveguide and coupler structures as are described in Applicant's co-pending United States Patent Application titled "HAMR READ-WRITE HEAD WITH COUPLER AND WAVEGUIDE" U.S. Ser. No. 17/851,159, filed on Jun. 28, 2022, the entirety of which is incorporated herein by reference. For example, a light guidance system as described in the present description may include the diffractive cavity as described, in combination with a coupler that has a trapezoidal cross section.

The devices and structures described herein can be prepared by known methods of preparing microelectronic devices, including heat-assisted magnetic recording heads. Example techniques include layer deposition steps, epitaxial growth, masked etching, photolithography, etc., to form desired optical, magnetic, and electronic components of the recording heads. Other techniques include those referred to as transfer printing, dry transfer printing, and nanotransfer printing, and on-wafer laser (OWL) process integration. Example methods are described in U.S. Pat. No. 10,783,917, the entirety of which is incorporated herein by reference.

The invention claimed is:

1. An apparatus comprising:
an optical coupler that receives light from a light source at a coupler input facet, the optical coupler having a length extending from the input facet in a direction of light propagation through the coupler,
a waveguide coupled to the optical coupler at a coupler-waveguide interface,
a diffractive cavity coupled to the optical coupler between the input facet and the coupler-waveguide interface, wherein the diffractive cavity has a focusing structure that produces a lensing effect,
a near-field transducer coupled to the waveguide, that provides electromagnetic heating for a heat assisted magnetic recording write head.

2. An apparatus of claim 1, the diffractive cavity is a disk-shaped cavity having a radius in a range from 0.5 to 3 microns.

3. An apparatus of claim 1, the coupler having a length, measured from a coupler input facet to a location at a distal end of the coupler-waveguide interface, in a range from 7 to 40 microns.

4. An apparatus of claim 1, the coupler having a width in a range from 1 to 5 microns.

5. An apparatus of claim 1, the coupler having a thickness in a range from 0.7 to 1.2 microns.

6. An apparatus of claim 1, comprising a laser adapted to emit light into the input facet, the laser having a length of at least 100 microns.

7. An apparatus of claim 1 wherein a refractive index of the diffractive cavity is the same as the refractive index of the waveguide.

8. An apparatus of claim 1, wherein the waveguide is made of NbOx.

9. An apparatus of claim 1, wherein the diffractive cavity is made of NbOx.

10. An apparatus of claim 1, wherein the coupler comprises a straight portion that is in optical communication with the diffractive cavity, and the straight portion is made of SiON.

11. An apparatus of claim 1, comprising cladding that surrounds the coupler, wherein the cladding is made of $SiO_2$.

12. An apparatus of claim 1, the coupler having a length, measured from a coupler input facet to a location at a distal end of the coupler-waveguide interface, in a range from 7 to 40 microns, and the apparatus comprising a laser adapted to emit light into the input facet, the laser having a length of at least 100 microns.

13. A method of recording data using an apparatus of claim 1.

14. A method of recording data using a heat assisted magnetic recording head, the magnetic recording head comprising:
a light source,
an optical coupler that receives light from the light source at a coupler input facet, the optical coupler having a length extending from the input facet in a direction of light propagation through the coupler,
a waveguide coupled to the optical coupler at a coupler-waveguide interface,
a diffractive cavity coupled to the optical coupler between the input facet and the coupler-waveguide interface, wherein the diffractive cavity has a focusing structure that produces a lensing effect,
a near-field transducer coupled to the waveguide, that provides electromagnetic heating for a heat assisted magnetic recording write head,
the method comprising:
activating the light source to direct light into the coupler input facet,
allowing the light to propagate through the coupler and into the waveguide, to be received by the near-field transducer.

15. A method of claim 14, the diffractive cavity having a radius in a range from 0.5 to 3 microns.

16. A method of claim 14, the diffractive cavity having a height in a range from 70 to 170 nanometers.

17. A method of claim 14, the coupler having a length, measured from a coupler input facet to a location at a distal end of the coupler-waveguide interface, in a range from 7 to 40 microns.

18. A method of claim 14, wherein the light source is a laser having a length of at least 100 microns.

19. A method of claim 14, the coupler having a length, measured from a coupler input facet to a location at a distal end of the coupler-waveguide interface, in a range from 7 to 40 microns, and the apparatus comprising a laser adapted to emit light into the input facet, the laser having a length of at least 100 microns.

20. A method of preparing a light guidance system comprising an apparatus of claim 1, the apparatus comprising:
a laser light source,
an optical coupler that receives light excited by a light source at a coupler input facet, the coupler having a length extending from the input facet in a direction of light propagation through the coupler,
a waveguide coupled to the optical coupler at a coupler-waveguide interface,
a diffractive cavity coupled to the optical coupler between the input facet and the coupler-waveguide interface,
a near-field transducer coupled to the waveguide, that provides electromagnetic heating for a heat assisted magnetic recording write head,
wherein the light guidance system experiences mode hopping that varies based on a length of the laser,
the method comprising forming the laser to have a length that corresponds to a region of a minimum on a curve of mode hop effect versus laser length.

* * * * *